United States Patent [19]

Sutherland

[11] Patent Number: 5,486,563
[45] Date of Patent: Jan. 23, 1996

[54] PROCESS FOR MAKING DISPERSANT VISCOSITY INDEX IMPROVERS

[75] Inventor: Robert J. Sutherland, Houston, Tex.

[73] Assignee: Shell Oil Company, Houston, Tex.

[21] Appl. No.: 359,806

[22] Filed: Dec. 20, 1994

[51] Int. Cl.$^6$ ................................. C08L 51/00
[52] U.S. Cl. ...................... 524/534; 525/299; 525/353
[58] Field of Search .................... 525/299, 353; 524/534

[56] References Cited

U.S. PATENT DOCUMENTS

| | | |
|---|---|---|
| 4,160,739 | 7/1979 | Stanbaugh et al. ............ 525/299 |
| 4,246,374 | 1/1981 | Kopchik .................... 525/329 |
| 4,735,736 | 4/1988 | Chung ...................... 525/299 |
| 5,264,139 | 11/1993 | Mishra et al. ............... 525/353 |
| 5,272,211 | 12/1993 | Sutherland et al. ........... 525/299 |
| 5,338,802 | 8/1994 | DuBois et al. ............... 525/299 |
| 5,344,887 | 9/1994 | Sutherland et al. ........... 525/299 |
| 5,356,999 | 10/1994 | Kapuscinski et al. .......... 525/299 |

Primary Examiner—Peter D. Mulcahy
Attorney, Agent, or Firm—Keith M. Tackett

[57] ABSTRACT

Star polymers having polymeric arms of a hydrogenated conjugated diene and substantially smaller polymeric arms of an alkyl methacrylate are efficiently reacted with amines after preparation of a concentrate of the polymer in a lubricating oil to form a dispersant viscosity index improver.

11 Claims, No Drawings

PROCESS FOR MAKING DISPERSANT VISCOSITY INDEX IMPROVERS

FIELD OF THE INVENTION

This invention relates to star polymers having ester groups. More particularly, the invention relates to use of modified star polymers of hydrogenated isoprene as dispersant viscosity index improvers for oil compositions.

BACKGROUND OF THE INVENTION

Star polymers useful as viscosity index improvers for oils and lubricants are described in U.S. patent pending application Ser. No. 942,019 filed Sep. 8, 1992 (T4773N). The star polymers have blocks of a methacrylate at the end of polymeric arms that are grown from a coupled core of a smaller star polymer. The smaller star polymers are prepared by crosslinking small blocks of styrene, isoprene, or butadiene with divinyl benzene. The larger polymeric arms are grown at active lithium sites on the central core of the small star polymers. The methacrylate blocks at the end of the polymeric arms have a strong tendency to couple two or more of the star polymer cores. Coupling of the star polymer cores effectively broadens the molecular weight distribution of the star polymers and reduces performance as viscosity index improvers for lubricating oils. Elimination of the coupling would improve performance in lubricating oils.

Addition of amide or imide groups to polymeric viscosity index improvers increases the dispersency of sludges in lubricating oils. Conversion of acrylic groups in acrylic polymers to amide or imide groups is described in U.S. Pat. No. 4,246,374 which teaches reaction of the acrylic group with an anhydrous primary amine. The conversion reaction occurs between outer limits of about 200° C. and 450° C.

Conversion of the acrylic groups to amide groups will occur in the presence of other monomer units such as styrene, butadiene, or isoprene. However, butadiene and isoprene units in the polymers thermally degrade at temperatures between about 200° C. and 450° C. Conversion of acrylic groups to imide groups at lower temperatures would reduce degradation of polymers containing butadiene or isoprene.

SUMMARY OF THE INVENTION

Star polymers having polymeric arms of a hydrogenated conjugated diene and substantially smaller polymeric arms of a methacrylate are efficiently reacted with amines after preparation of a concentrate of the polymer in a lubricating oil to form a dispersant viscosity index improver.

DESCRIPTION OF THE INVENTION

The present invention employs a polymer molecule comprising at least 3 first arms comprising a preponderance of a hydrogenated, polymerized conjugated alkadiene or a polymerized vinyl arene monomer, or both in a block or tapered structure, each arm having a molecular weight from 10,000 to 200,000, at least 3 arms comprising a preponderance of a polymerized methacrylate, each arm having a molecular weight from 1,000 to 50,000, and a central core comprising a polymerized bisunsaturated monomer, wherein the central core connects the arms in a star configuration and the first arms are longer than the second arms. The star polymers are decribed in U.S. Pat. No. 5,344,887 which description is incorporated herein by reference.

The present invention is a process for reacting the star polymers with amines to provide a dispersant viscosity index improver for lubricating oils. Preferably, at least 90% of the polymerized alkyl methacrylate units are converted to amide groups which is readily achieved when the second arms comprise polymerized t-butylmethacrylate.

The star block polymers of the invention are produced by preparing first arms comprising a preponderance of the conjugated diene, coupling the first arms by polymerizing the bisunsaturated monomer, growing second arms comprising the alkyl methacrylate from the polymerized biunsaturated monomer, and hydrogenating the polymerized conjugated diene. The conjugated diene, preferably isoprene or butadiene, is anionically polymerized with an initiator, preferably an alkyl lithium. Alkyl lithium initiators having a secondary alkyl group are preferred. Most preferred is sec-butyllithium.

The bisunsaturated monomer couples the conjugated diene arms into a "star" molecule having a plurality of the first polymeric arms radiating from a central core which comprises the polymerized bisunsaturated compound. After coupling, the core of the molecules contain residual lithium sites which initiate the growth of the second polymeric arms.

One or more of the first polymeric arms may comprise a polymerized vinyl arene, alone, or in a tapered or block configuration with the polymerized conjugated alkadiene. The preferred vinyl arene is styrene and the preferred styrene content for the star polymers is less than 10%.

The polymerization to produce the first polymeric arms is conducted by the conventional method of contacting the monomer and polymerization initiator in a suitable reaction solvent under moderate reaction conditions. Hydrocarbon reaction solvents, particularly cycloaliphatic hydrocarbon solvents such as cyclohexane are suitable as reaction solvents. It is useful on some occasions to employ a reaction solvent of greater polarity and in such instances a mixed solvent, often a mixture of cyclohexane and a polar co-solvent, e.g., an ether co-solvent such as diethyl ether or tetrahydrofuran, is used. The use of cyclohexane or cyclohexane-diethyl ether as reaction solvent is preferred. The polymerization temperature is moderate, for example from about 10° C. to about 80° C. and it is often useful to conduct this polymerization at ambient temperature. The reaction pressure is a pressure sufficient to maintain the reaction mixture in a liquid phase. Typical reaction pressures are from about 0.8 to about 5 atmospheres.

Control of the molecular weight of the first polymeric arms is achieved by conventional methods such as controlling the ratio of initiator to monomer. The polymeric arms are conventionally termed a living polymer because of the presence therein of an organometallic site. The first polymeric arms preferably have a peak molecular between 10,000 and 200,000, most preferably between 20,000 and 100,000.

The first polymeric arms serve as the polymerization initiator for the bisunsaturated monomer which crosslinks to form the central core of the star polymer molecules. A variety of bisunsaturated monomers are useful in the production of the core of the star block polymers of the invention. Preferred bisunsaturated monomers are di(alkenyl) aromatic compounds having up to 20 carbon atoms and up to 2 aromatic rings, including divinylbenzene, divinyltoluene, divinylbiphenyl, divinylnaphthalene, diisopropenylbenzene, diisopropenylbiphenyl and diisobutenylbenzene. Most preferred is divinylbenzene.

The crosslinking of the bisunsaturated monomer with the first polymeric arms is preferably conducted by adding the bisunsaturated monomer to the reaction mixture containing the first polymeric arms. The use of the same or similar reaction conditions and solvent are suitable for the crosslinking reaction to form the core of the star block polymer.

The core of crosslinked bisunsaturated monomer has a plurality of organometallic sites which serve as the polymerization initiator for the methacrylate which forms the relatively smaller second polymeric arms. Alkyl methacrylates are preferred and have the structure

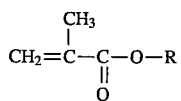

wherein R is an alkyl group comprising from 1 to 30 carbon atoms, preferably from 1 to 20 carbons. The alkyl methacrylate is polymerized through the ethylenic unsaturation of the methacrylate group. The alkyl methacrylate monomers which are polymerized according to this invention include methyl methacrylate, ethyl methacrylate, sec-butyl methacrylate, t-butyl methacrylate, sec-amyl methacrylate, octyl methacrylate, decyl methacrylate, dodecyl methacrylate and octadecyl methacrylate. Polymerization is preferably conducted in the reaction mixture containing the star molecules having organometallic sites on the central core.

The choice of alkyl methacrylate will in part depend upon the particular nature of the star block polymer desired. However, the production of polymerized alkyl methacrylate branches wherein the alkyl is primary and of few carbon atoms is relatively difficult because of the rather low reaction temperatures that are required to produce the polymerized alkyl methacrylate branches. Alternatively, the production of polymerized alkyl methacrylate branches wherein the alkyl moiety is a higher alkyl moiety is also difficult because of the relatively inactive character of such alkyl methacrylates and the difficulty of readily obtaining the desired alkyl methacrylate monomer. The preferred alkyl methacrylates for forming the star block polymer of methacrylate-containing branches is a branched-butyl methacrylate, i.e., sec-butyl methacrylate or t-butyl methacrylate. The star block polymers resulting from use of these methacrylates are preferred products because of the desirable properties thereof and because of the relative ease of production. Star block polymers incorporating other alkyl methacrylate moieties are produced directly from the corresponding alkyl methacrylate but it is often desirable to produce such polymers by initially employing a branched-butyl methacrylate to produce a star block polymer having branched-butyl methacrylate branches and subsequently trans-esterifying the initial star block polymer product to incorporate the desired alkyl moieties.

In the production of a branched-butyl methacrylate-containing polymer suitable reaction conditions typically include a reaction temperature from about −80° C. to about 80° C. with the lower portion of that range being preferred for polymerization of sec-butyl methacrylate and the higher portion of the range being preferred for t-butyl methacrylate. The polymerization pressure is sufficient to maintain the reaction mixture in a liquid phase, typically up to about 5 atmospheres.

The star polymers are hydrogenated to reduce the extent of unsaturation in the aliphatic portion of the polymer. A number of catalysts, particularly transition metal catalysts, are capable of hydrogenating the aliphatic unsaturation of the star polymers. It is preferred to employ a "homogeneous" catalyst formed from a soluble nickel compound and a trialkylaluminum. Nickel naphthenate or nickel octoate is a preferred nickel salt. Although this catalyst system is one of the catalysts conventionally employed for selective hydrogenation in the presence of aromatic groups, other "conventional" catalysts are not suitable for hydrogenation of the conjugated alkadienes in the ester containing polymers.

In the hydrogenation process, the base polymer is reacted in situ, or if isolated is dissolved in a suitable solvent such as cyclohexane or a cyclohexane-ether mixture and the resulting solution is contacted with hydrogen gas in the presence of the homogeneous nickel catalyst. Hydrogenation takes place at temperatures from about 25° C. to about 150° C. and hydrogen pressures from about 15 psig to about 1000 psig. Hydrogenation is considered to be complete when at least about 90%, preferably at least 98%, of the carbon-carbon unsaturation of the aliphatic portion of the base polymer has been saturated, as can be determined by nuclear magnetic resonance spectroscopy.

The hydrogenated star polymer is then recovered by conventional procedures such as washing with aqueous acid to remove catalyst residues, solvent removal, or addition of a non-solvent to coagulate the polymer. A typical non-solvent for this purpose is aqueous methanol.

The star polymer is reacted with an amine after forming a concentrate of the star polymer in a lubricating oil. Concentrates of polymeric viscosity index improvers are frequently sold to simplify the formulation of commercial lubricating oils. Amidation of the star polymer after formation of the concentrate can be readily done by the formulator of the lubricating oil using any compatible amine.

The star polymer is dissolved in a lubricating oil at a temperature of at least 120° C. to form a concentrate having from 3% to 30% by weight of the star polymer. The methacrylate ester groups on the star polymer are then saponified to carboxylic acid groups by reaction with p-toluenesulfonic acid, or other suitable strong organic acid. The carboxylic acid groups then readily react with the amine at 120° C. to form the ammonium salt. The concentrate is then heated to 140°–180° C. for between 0.1 and 45 minutes to convert the ammonium salt to the amide or imide form.

Suitable amines are alkyl or aryl amines containing from 1 to 10 nitrogen atoms having at least one primary or secondary amine site. The preferred amines are primary amines having the structure R-NH$_2$ as described in column 3, lines 32-62, of U.S. Pat. No. 4,246,374 which disclosure is incorporated by reference herein. The most preferred primary amine is N,N-diethylaminopropylamine (DAP).

The preferred amines may contain secondary or tertiary amines. Additional amines include, but are not limited to, N,N-dimethylpropylamine, triethylene tetramine, aniline, and tertaethylenepentamine.

DESCRIPTION OF A PREFERRED EMBODIMENT

The preferred polymers for use in the invention comprise an average per molecule of 10–50 first arms consisting of at least 90% by weight of hydrogenated, polymerized isoprene, the first arms having a peak molecular weight from 10,000 to 100,000, at least 10–50 second arms consisting of at least 20% by weight of polymerized t-butylmethacrylate, the second arms having a peak molecular weight from 1,000 to 10,000, and one central core per molecule, the core comprising polymerized divinylbenzene, wherein the central cores connect the first and second polymeric arms in a star configuration. The star polymers are dissolved in a lubricating oil to a polymer concentration from 3% to 30% by weight, converted from ester to acid form with an acid catalyst, and are then reacted with an amine, most preferably N,N-diethylaminopropylamine.

The molecular weight of the preferred star polymers of the invention will vary with the choice of reaction conditions, reaction solvent and the relative proportions of monomeric reactants as well as determined in part by whether the functionalized branches are homopolymeric or contain an internal portion of polymerized anionically polymerizable monomer. The star polymers of particular interest have a peak molecular weight from about 33,000 to about 5.5×10$^6$ and most preferably from about 100,000 to about 3×10$^6$. The precise peak molecular weight will vary from molecule to molecule and the above values are average values. It is, however, characteristic of the star polymers of the invention that the polymer has a rather narrow molecular weight distribution.

The preferred star polymers are represented by the formula $$(A\text{---})_t\text{---}C\text{---}(\text{---}M)_s \qquad (I)$$

wherein C represents the core comprising crosslinked divinylbenzene, A represents the first arms consisting of at least 90% by weight of the hydrogenated, polymerized isoprene, M represents the second arms consisting of at least 20% by weight of the polymerized t-butylmethacrylate, s is from 10 to 50, and t is from 10 to 50, wherein t is equal to or greater than s.

While the proportions of the moieties represented by the terms C, A, and M will vary somewhat from molecule to molecule, the percentage of the molecular weight of the molecule attributable to the central core, C, is no more than about 10% and preferably no more than about 2%.

Each A block or segment in the preferred star polymer preferably has at least 90% by weight of the hydrogenated, polymerized isoprene. Within the preferred A block, one or more blocks of styrene or hydrogenated butadiene having high 1,4-addition can be placed to improve physical properties of the polymer.

Each M is preferably at least 20% by weight of polymerized t-butylmethacrylate. Homopolymeric M segments or blocks are most preferred. The t-butylmethacrylate monomer is commercially available in high purity from Mitsubishi-Rayon, Japan. Less pure t-butylmethacrylate is available from Monomer, Polymer and Dajac and can be used if passed through a column of alumina and 13X zeolite to remove methacrylic acid and t-butylalcohol. The preferred zeolites have a cavity size no less than 10 angstroms such as Zeolite 13X which has the formula $Na_{86}(AlO_2)_{86}(SiO_2)_{106}267H_2O$.

The star polymers of this invention have the advantage of little or no coupling of two or more molecules during polymerization of the alkyl methacrylate.

The amine is added after the methacrylic ester has been exposed to the carboxylic acid at 120° to 130° C., the temperature is then increased to 140° to 180° C. for about 0.1 to 45 minutes to effect the conversion to the amide or imide form.

The process of the invention makes dispersant viscosity index improvers that are concentrated in a lubricating oil for later formulation as a commercial lubricating oil.

The invention is further illustrated by the following Illustrative Embodiments which should not be construed as limiting.

Star Polymer Synthesis

A first reactor was charged with 270 pounds of cyclohexane and 30 pounds of styrene monomer. To the stirred mixture 6.5 pounds of sec-butyllithium was added and the styrene was polymerized for 10 half-lives at 60° C.

In a second reactor 273 pounds of cyclohexane and 50 pounds of isoprene monomer were titrated with sec-butyllithium to remove any impurities. Then 27 pounds of the living homopolystyrene from step 1 was added to the isoprene and the isoprene was polymerized for 12 half-lives at 60° C. Next, 200 ml of divinylbenzene (55% dvb) was added to the living styrene-isoprene polymeric arms and reacted at 80° C. for 30 minutes to form the living star polymer.

The temperature of the star polymer mixture was lowered to 35° C. and 1.20 pounds of tert-butylmethacrylate (tBMA) was added to the reaction. The tBMA was polymerized for 30 minutes at 35° C. to form the second polymeric arms, and the reaction was quenched with 19 ml of methanol.

The star polymer was hydrogenated using a catalyst composed of nickel octoate reduced by triethyl aluminum. The ratio of nickel to aluminum for this particular example was 1:2.3. The total catalyst charge was periodically increased to give a product with low residual unsaturation.

EXAMPLE 1A, 1B

A beaker containing 360 grams of Exxon 100N LP lubricating oil, 0.2 grams Irganox 1010 antioxidant, and 0.1 grams of p-toluenesulfonic acid was heated to 125° C. Then 40 grams of the star polymer described above was added and dissolved. Analysis by FT-IR confirmed that the methacrylate groups had converted to carboxylic acid groups by the time the polymer had completely dissolved. Then 1.9 grams of diethylaminopropylamine (DAP) was added as a 50% by weight solution of amine in the Exxon 100N LP base oil. The oil concentrate temperature was then increased to 180° C. and the solution was removed from the heat (example 1A). Analysis by FT-IR showed that the acid groups were completely converted to amide groups. Example 1-B is a concentrate of the starting non-modified polymer containing intact methacrylate ester groups.

EXAMPLE 2

A beaker containing 360 grams of Exxon 100N LP lubricating oil and 0.2 grams Irganox 1010 antioxidant was heated to 125° C. Then 40 grams of the star polymer described above was added and dissolved. Then 0.1 grams of p-toluenesulfonic acid was added to the mixture and allowed to react for 30 minutes to convert the methacrylate groups to acid groups. Analysis by FT-IR confirmed that the methacrylate groups had converted to carboxylic acid. Then 1.9 grams of diethylaminopropylamine (DAP) was added as a 50% by weight solution of amine in the Exxon 100N LP base oil. The oil concentrate temperature was then increased to 180° C. and the solution was removed from the heat. Analysis by FT-IR showed that the acid groups were completely converted to amide groups.

EXAMPLE 3A–3E

The procedures of Examples 1 and 2 were used to make additional dispersant viscosity index improvers as indicated in the tables by replacing the DAP with various amines including: ethylenediamine (EDA) (example 3A), diethylenetriamine (DETA) (example 3B), triethylenetetramine (TETA) (example 3C), tetraethylenepentamine (TEPA) (example 3D), and mixtures of linear alklamines (example 3E). The time at which the concentrates were held at 180°

C. varied from 0.1 to 30 minutes based on FT-IR evidence of the conversion to the amide.

EXAMPLE 4

The oil concentrates of Examples 1, 2, 3A–E were used to blend SAE 5W-30, 10W-40, and 15W-40 finished motor oils.

EXAMPLE 5 (COMPARISON A)

The conversion of a star polymer to a dispersant viscosity index improver was carried out in an extruder. For this particular example a Brabender melt mixer was used. The Brabender was heated to 250° C. and 60 grams of polymer was added with the mixing blades at 100 rpm. When the melt was uniformly mixed, a mixture of N,N-diethylaminopropylamine (DAP) and Penrico Oil was added over 3 minutes time (the oil serves to prevent the DAP from vaporizing out of the Brabender before it can mix with the polymer melt). The sample was allowed to mix for 3 minutes longer and then was removed from the Brabender.

FT-IR analysis shows conversion to the amide, the ester peak at 1726 cm$^{-1}$ is replaced by an amide peak at 1667 cm$^{-1}$. Analysis by FT-IR revealed that the conversion to amide was at least 80% based on the ratio of carbonyl absorbance to amide carbonyl absorbance. The product was then dissolved into oil to form a concentrate for use in further blending of finished motor oils.

EXAMPLE 6 (COMPARISON B)

The dispersant VI improver from Example 5 was blended with a motor oil to give SAE 5W-30 and 10W-40 formulations. The oils in Tables 1–4 were blended in Exxon 100N LP, the DI package was an experimental Lubrizol additive, and Acryloid 155 pour point depressant was added at 0.5 wt. % of the polymer concentrate to give about 11cSt kinematic viscosity at 100° C. The cold cranking simulator (CCS) viscosity was measured at –25° C.

While extruding the TBMA functionalized polymer with an amine will produce a useful dispersant VI improver, it requires an extra step (going through the extruder) and exposes the polymer excessive heat and shear stress. The extruder method is thus limited to polymers that can withstand the heat and shear, while the inventive oil concentrate method is not limited in this regard. Thus the inventive procedure may be used for low and moderate molecular weight polymers and for high molecular weight polymers whose melt viscosity is too high to allow them to be extruded without degradation.

TABLE 1

SAE 15W-40 OIL FORMULATIONS.

| Example | GRADE | KV | CCS | MRV | TBS | % VIS LOSS[1] | % poly | % HVI |
|---|---|---|---|---|---|---|---|---|
| 3-A | 15W-40 | 14.1 | 3140 | 10504 | 3.83 | 9 | 0.72 | 50 |
| 3-B | 15W-40 | 14.2 | 3160 | 10563 | 3.84 | 9 | 0.72 | 50 |
| 3-C | 15W-40 | 14.1 | 3160 | 10389 | 3.84 | 8.5 | 0.71 | 50 |
| 3-D | 15W-40 | 14.3 | 3200 | 10664 | 3.88 | 9.1 | 0.72 | 50 |

[1] ASTM D-3945A PERMANENT SHEAR STABILITY TEST.

TABLE 2

SAE 10W-40 OIL FORMULATIONS.

| Example | GRADE | KV | CCS | MRV | TBS | % poly | % HVI |
|---|---|---|---|---|---|---|---|
| 1-B | 10W-40 | 14.1 | 3230 | 15251 | 3.71 | 0.96 | 30 |
| 1-A | 10W-40 | 14 | 3230 | 14449 | 3.65 | 0.99 | 30 |
| 3-A | 10W-40 | 14.1 | 3240 | 15049 | 3.66 | 1.00 | 30 |
| 3-B | 10W-40 | 14 | 3260 | 14931 | 3.65 | 1.00 | 30 |
| 3-C | 10W-40 | 14.1 | 3230 | 14626 | 3.64 | 0.98 | 30 |
| 3-D | 10W-40 | 14.3 | 3270 | 15652 | 3.72 | 1.00 | 30 |
| 3-E | 10W-40 | 14.1 | 3260 | 15233 | 3.71 | 0.97 | 30 |

TABLE 3

SAE 5W-30 OIL FORMULATIONS.

| Example | GRADE | KV | CCS | MRV | TBS | % poly | % HVI |
|---|---|---|---|---|---|---|---|
| 1-B | 5W-30 | 11.2 | 3020 | 13508 | 3.10 | 0.91 | 0 |
| 2 | 5W-30 | 11.1 | 3020 | 13429 | 3.02 | 0.94 | 0 |
| 3-A | 5W-30 | 11.1 | 3030 | 13027 | 3.02 | 0.95 | 0 |
| 3-B | 5W-30 | 10.9 | 3040 | 13268 | 2.99 | 0.94 | 0 |
| 3-C | 5W-30 | 11.1 | 3050 | 12810 | 3.02 | 0.94 | 0 |
| 3-D | 5W-30 | 11.1 | 3060 | 14119 | 3.02 | 0.93 | 0 |
| 3-E | 5W-30 | 11.1 | 3060 | 14506 | 3.09 | 0.93 | 0 |

TABLE 4

Rheology of SAE 5W-30 oils containing DVII polymer.

| VII | KV, cSt | CCS, cP |
|---|---|---|
| PARATONE ® 855 | 11.0 | 4142 |
| ACRYLOID ® 954 | 10.8 | 3472 |
| AMOCO ® 6565 | 10.7 | 3527 |
| TLA ® 7200 | 10.8 | 3598 |
| Comparison B | 10.7 | 3245 |
| Example 1A | 10.8 | 3056 |

What is claimed is:

1. A process for making a dispersant viscosity index improver, comprising the sequential steps of:

dissolving a star polymer in a lubricating oil at a polymer concentration of from 3% to 30% by weight, the star polymer comprising:

at least 3 first arms comprising a preponderance of a hydrogenated, polymerized conjugated alkadiene, the first arms having a peak molecular weight from 10,000 to 200,000;

at least 3 second arms comprising a preponderance of a polymerized methacrylate, the second arms having a peak molecular weight from 500 to 10,000; and a central core comprising a polymerized bisunsaturated monomer, wherein the central core connects the first and second arms in a star configuration;

reacting the dissolved star polymer with an acid catalyst; and reacting the dissolved star polymer with an amine.

2. The process of claim 1 wherein the amine is reacted at a temperature of between 160° to 180° C. for between 0.1 and 30 minutes.

3. The process of claim 1, wherein the conjugated diene is isoprene or 1,3-butadiene.

4. The process of claim 1, wherein the methacrylate has the structure

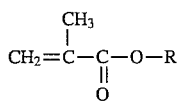

wherein R is an alkyl group having from 1 to 30 carbon atoms.

5. The process of claim 4, wherein the methacrylate is t-butylmethacrylate, sec-butylmethacrylate, or a combination thereof.

6. The process of claim 1, wherein the acid catalyst is p-toluenesulfonic acid.

7. The process of claim 1, wherein the bisunsaturated monomer is divinylbenzene.

8. A process for making a dispersant viscosity index improver, comprising the sequential steps of:

dissolving a star polymer in a lubricating oil at a polymer concentration of from 3% to 30% by weight, the star polymer comprising:

an average per molecule of at least 10 first arms consisting of hydrogenated isoprene or styrene and hydrogenated isoprene, the first arms having a peak molecular weight from 10,000 to 100,000;

an average per molecule of at least 10 second arms consisting of polymerized t-butylmethacrylate, the second arms having a peak molecular weight from 1,000 to 10,000, wherein at least 80% of the polymerized t-butylmethacrylate units have been converted to amide groups; and one central core per molecule, the core comprising a polymerized divinylbenzene, wherein the central cores connect the first and second arms in a star configuration;

reacting the dissolved star polymer with an acid catalyst at a temperature between 100° to 130° C.; and reacting the dissolved star polymer with an amine at a temperature between 160° to 180° C.

9. The process of claim 8, wherein the first arms consist of at least 90% by weight of hydrogenated isoprene.

10. The process of claim 8, wherein the average number of first arms per polymer molecule is from 10 to 50 and the average number of second arms per polymer molecule is from 10 to 50.

11. The process of claim 8, wherein the peak molecular weight of the first arms is from 10,000 to 100,000 and the peak molecular weight of the second arms is from 500 to 10,000.

* * * * *